United States Patent [19]
Gefen et al.

[11] Patent Number: 5,135,429
[45] Date of Patent: Aug. 4, 1992

[54] DEVICE FOR NON-MANUAL CAPTURE, STORAGE AND TRANSPORT OF QUEEN BEES

[76] Inventors: David Gefen, 1 Ole Hagardon Street, Rishon Lezion; Elli Shmuelli, 53 Talmei Yechiel; Ehud Orgil, Kfar Bin-Nun; Avi Cohen, 32 Bet-Zuri Street, Tel-Aviv, all of Israel

[21] Appl. No.: 637,861

[22] Filed: Jan. 8, 1991

[30] Foreign Application Priority Data

Jan. 8, 1990 [IL] Israel .................................... 92997

[51] Int. Cl.$^5$ ............................................. A01L 49/00
[52] U.S. Cl. ................................................ 449/2; 449/28
[58] Field of Search ............................ 449/2, 8, 21, 28

[56] References Cited

U.S. PATENT DOCUMENTS

| | | | |
|---|---|---|---|
| 1,518,102 | 12/1924 | Philpott | 449/28 |
| 1,652,539 | 12/1927 | Marks | 449/28 |
| 2,403,840 | 7/1946 | Ashurst | 449/28 |

FOREIGN PATENT DOCUMENTS

1360677 12/1987 U.S.S.R. .................................. 449/28

*Primary Examiner*—Robert P. Swiatek
*Attorney, Agent, or Firm*—Fleit, Jacobson, Cohn, Price, Holman & Stern

[57] ABSTRACT

A cage-type device for trapping, storing, transporting and releasing a queen bee, possible with one or more worker bees. The cage comprises two slidingly attachable members which constitute bottom and roof members and also side-walls, in which there are provided entry and exit ports for the queen bee and for worker bees, which can be opened or closed, as required, by changing the relative position of the two slideable members. There is also provided a comparatively large opening, preferably in the floor section, for scooping up the queen bee, which can also be closed by a sliding motion of the two members. According to one embodiment, a compartment for a supply of bee food is provided. According to another embodiment, a slot of predetermined shape can be provided in one of the walls through which a movable member can be inserted, which makes it possible to move the queen bee to a desired location in the cage.

15 Claims, 13 Drawing Sheets

DEVICE FOR NON-MANUAL CAPTURE, STORAGE AND TRANSPORT OF QUEEN BEES

FIELD OF THE INVENTION

The present invention relates to beekeeping and particularly to devices for trapping, storing and conveying queen bees and accompanying worker bees.

BACKGROUND OF THE INVENTION

There exists a necessity to transfer (capturing and transporting) queen bees from hive to hive, particularly from bee breeders' hives to bee keepers' hives. The bees must be captured and conventionally this is achieved by manually picking up the queen bee and inserting it, with a few other bees, into a small cage having a plugged queen bee exit opening. It is generally not practical for the beekeeper to wear gloves, as the bees must be handled manually: thus there exists a risk that they will sting the beekeeper. One bee only may be transferred at a time. The queen bee and the cage are subsequently placed in a new hive and the exit opening is unplugged to permit egress of the queen bee into the new hive. The cages are typically formed of wood with a metal screen or plastic cover. This is painstaking, time consuming and requires professional beekeepers or bee breeders.

There is also known a device known as a Queen Catcher, available from Kelley Corporation, West Germany, which comprises two pivotably joined housing portions which may be selectably opened and closed. The device is operative to scoop up bees but sometimes scoops up also a portion of the honeycomb. There are provided apertures of dimensions which allow captured workers to exit the device, so that only the queen will remain inside. This device is difficult to use and there is a risk of harm to the queen or other bees during capture as a result of the pincer movement of the device. The device is not intended for transport of the queen, since it does not include means for nourishing the queen and does not comprise means for releasing the queen into the new hive. Thus it is necessary to manually transfer the queen from the device to a transport device for conveying the queen to a different location.

Nursery cages comprises one or a plurality of integrally formed units for hatching one or more queens from one or more grubs placed in the unit are known which are rather inconvenient to use. Each such unit comprises a grub containing device called a queen cell which is laid upon the top surface of the unit, and is not firmly attached to the top surface of the unit and may easily become detached, with the risk of queen escape. If a plurality of units is provided, the queens, once hatched, must be separately and manually transferred to their hives, since the units are integrally formed. Nursery cages are not designed for transport and are mainly used for research purposes and for artificial insemination.

Nursery cages and queen cells are commercially available from Kelley Corporation, West Germany.

Queen banks, comprising housing and a plurality of stacked queen bee enclosures are known. Each is formed with apertures which allow worker bees located interiorly of the housing but exteriorly of the enclosures to nourish the queen without having direct access thereto. The enclosures are generally box-like in shape and consequently, it is difficult to stack them compactly and sturdily without preventing blockage of apertures in some of the enclosures, by adjacent enclosures.

SUMMARY OF THE INVENTION

The present invention provides a cage type device and method for the transfer of queen bees from hive, which greatly simplifies and speeds up the transfer operation.

The device saves up to four minutes of the beekeeper's time per transfer of a single queen bee. Since actual manual handling of the bees is generally unnecessary, it is possible for the beekeeper to wear gloves while effecting transfer of the queen. The device includes queen bee caging means having at least three selectable positions: a first for capturing at least the queen bee, a second queen bee exiting one permitting the queen bee to exit the enclosure, and a third one for worker bees, while preventing exit of the queen.

According to the invention there is provided a cage-type device for the capture, transport and release of a queen bee, together with worker bees, comprising two slidingly connectable units which together constituted the outer walls of the cage, comprising an entry port for the queen bee and worker bees; an exit port for the worker bees, an internal storage compartment for bee food which is provided with an exit port for the queen bee, and air-holes in at least one of said two units these being of such construction that the sliding movement of the one respective the other permits opening of the entry port for scooping up the queen and worker bees; the other openings being closed; a second position where the entry port and all other openings (except for air-holes) are closed; a third position where an exit port for the worker bees only is open; and a fourth position where access to the exit port of the queen, located in the wall of the food storage compartment is free. Preferably one of the units comprises a floor section and three wall sections and the second unit comprises a cover and the front section.

According to another embodiment, one unit comprises a floor section and two side panels, and the second unit comprises a cover connected to a front panel, both units defining an enclosure, either one or both of floor and cover elements being curved and meeting the other at the rear end of the device.

The invention also relates to a method of capturing, transporting and releasing a queen bee by means of a device as defined above, via the bee entry port; closing this and all other openings for transport and storage; openings the exit port for the worker bees, if such are present; providing free access from both inside the device and its outside to the opening in the panel of the food storage compartment and permitting exit of the queen bee through this openings after bees have eaten through the stored bee-food, opening a path for said queen bee through such exit.

According to a further preferred embodiment, the device includes means for providing sustenance for the queen bee during transport.

According to a preferred embodiment of the present invention, the device comprises a cover selectably positionable with respect to the housing for selectably blocking the bee entrance.

According to a preferred embodiment, the cover is slidably mounted with respect to the housing so as to slidably close the bee entrance opening or openings. The bee entrance opening may be on the bottom surface. The bottom surface of the queen bee enclosure can be provided with spikes for enhancing engagement of the device with a honeycomb of a hive.

The housing can be formed with a curved bottom surface, so that when the entrance opening is placed onto the honeycomb over the queen bee, the remainder of the bottom is spaced from the honeycomb, thus reducing the risk of crushing bees.

Preferably at least a portion of the top surface of the device is transparent.

Preferably the queen bee exit opening is blocked by a deposit of bee food.

The queen bee exit opening and the deposit of bee food can be located in the base port of the cage in the cover.

There can be provided four selectable positions where the fourth is a closed position wherein access of worker bees located externally of the queen bee enclosure means to the deposit of bee food is blocked.

The bee entrance opening can be of relatively large size so that the housing can be positioned so that the bee entrance opening lies over a queen bee and adjacently located bees, which enables the queen bee and adjacent worker bees to be simultaneously trapped inside the queen bee enclosure means.

The device can include means for suspending the device within a bee hive.

Preferably, airholes are provided in the device and the airholes are preferably arranged so as not to be blocked by similar devices stacked on, under and around the device.

There is also provided a method for capture of a queen bee and transport thereof from a first hive to a second hive including the steps of placing the device over a queen bee and adjacent worker bees in a first hive, transporting the device and contact to a second hive, allowing bees from the second hive to enter the apparatus, the queen bee enclosure being in the queen bee exiting position, allowing the queen bee exit into the second hive.

There can also be provided, in accordance with a preferred embodiment of the present invention, a queen bank including a plurality of stacked queen bee enclosure means, each queen bee enclosure means having at least two selectable positions including a first capturing position for capturing at least the queen bee, and a second queen bee exiting position for permitting the queen bee to exit the enclosure means, with air-holes provided in the enclosure means which are so arranged that they are not blocked by similar queen bee enclosure means stacked on, under or around.

There can be further provided, in accordance with an embodiment of the invention, a nursery cage assembly including a plurality of stacked queen bee enclosures each having a selectable queen bee exit position permitting a hatched queen bee to exit the enclosure, each of the plurality of stacked queen bee enclosures including a queen cell located in the queen bee enclosure and removably engaged therewith and means for providing sustenance for the queen bee during transport thereof.

BRIEF DESCRIPTION OF THE DRAWINGS

The present invention is illustrated in conjunction with the schematical drawings, not according to scale.

DETAILED DESCRIPTION OF THE INVENTION

Figure 1A:
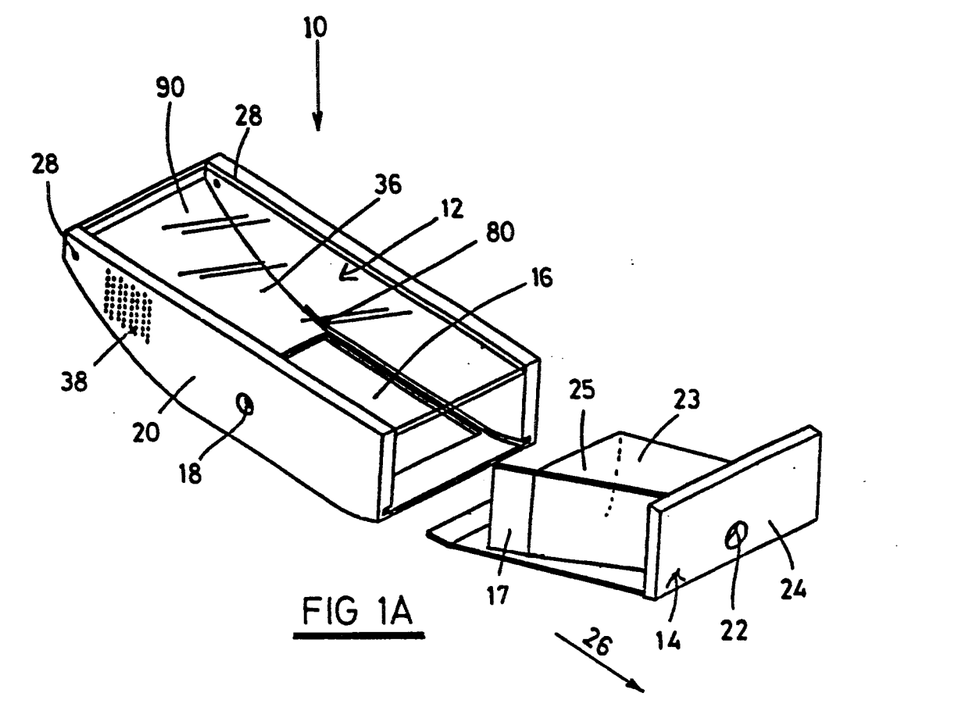
FIGS. 1A and 1B are views of a queen bee transfer device in respective disengaged (capturing) and fully closed (transporting) positions.
Figure 1B:
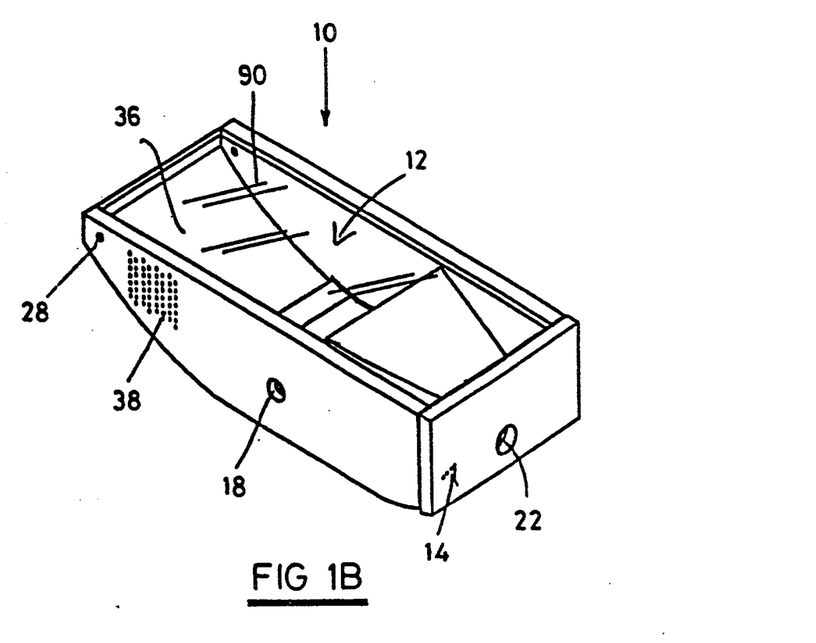
Figure 1C:
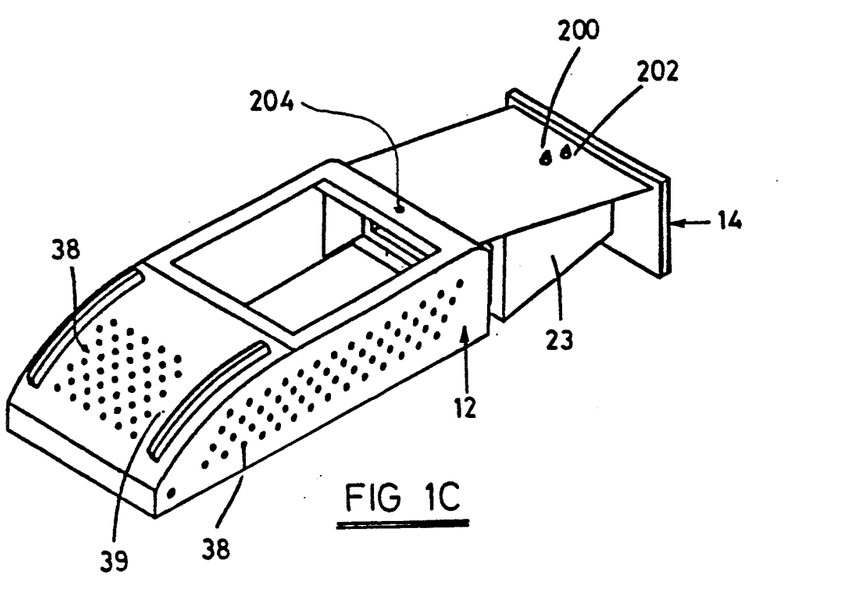
FIG. 1C is a view of the underside of the bee transfer device of FIG. 1A.

FIGS. 1A-1C illustrate a queen bee transfer device 10 according to an embodiment of the present invention which includes a housing 12 and cover 14 which is selectably positionable with respect to the housing 12 for selectably blocking a bee entrance opening 16, typically in the bottom surface of the device, where the cover 14 is slidably mounted with respect to the housing to allow the bee entrance opening 16 to be slidably closed when desired. The cover includes a blocking wall portion 17 which is slidable to close off worker bee exit opening 18 preferably in wall 20 of the housing 12. There is also provided a queen bee exit opening 22, preferably in wall 24 of cover 14 which is generally perpendicular to the wall 20 when the device 10 is in engaged position.

Preferably, the bee entrance opening 16 is of relatively large dimensions, to allow easy capture of a queen bee and adjacently located bees by positioning the housing so that the bee entrance opening 16 lies over the queen bee and other bees, and sliding the cover apparatus 14 so that the device 10 assumes the fully closed position of FIG. 1B.

The queen bee exit opening 22 is advantageously blocked by a deposit of bee food, preferably within a food receptacle 23 located adjacent queen bee exit opening 22. This deposit, known as "candy", serves to nourish the worker bees which in turn maintain the queen bee during the stay in the device 10. Access of the workers to the candy is through candy box opening 25. Also, the worker bees from the new hive eat their way through queen bee exit opening 22, thereby unblocking access therethrough to the queen bee. This results in the establishment of contact between the queen bee and the worker bees from the new hive and subsequent egress of the queen into the new hive.

As shown in FIG. 1A, the location of worker bee exit opening 18, and the configurations and mutual arrangement of housing 12, and cover apparatus 14, are such as to allow worker bee exit opening 18 to be selectably blocked by appropriate positioning of the cover relative to the housing. The device 10 shown allows exit opening 18 to be unblocked when bees are inside the device, by sliding out the cover 14 in the direction of the arrow 26 to unblock exit opening 18, but not to allow bee entrance opening 16 to be unblocked. Since the dimensions of the workers' bee exit opening 18 is typically smaller than the dimensions of the queen bee, this allows the worker bees to exit the device while the queen bee remains confined therewithin. The structure of the device defines at least three selectable positions of the device.

1. Entrance open: Bee entrance 16 is open. Queen exit 22 blocked at least by candy, and worker bee exit 18 is not blocked by the cover apparatus. The device is urged into this position when it is desired to capture the queen.

2. Worker bee-exit open: Worker bee exit 18 is open, queen exit 22 is blocked with candy and bee entrance 16 is closed. The device is urged into this position prior to placing of the device in the new hive, to allow worker bees from the old hive to exit the device while not allowing egress of the queen.

3. Queen exiting orientation has entrance 16 and worker bee exit 18 are closed. The queen exit 22 is blocked only by the candy, the device is urged into this position as the device is inserted into the new hive, once the worker bees have been allowed to exit, thereby preventing worker bees from the new hive from penetrating the device until the candy blocking queen exit 22 has been eaten through by the worker bees, when the queen bee may exit the device.

Figure 2A:
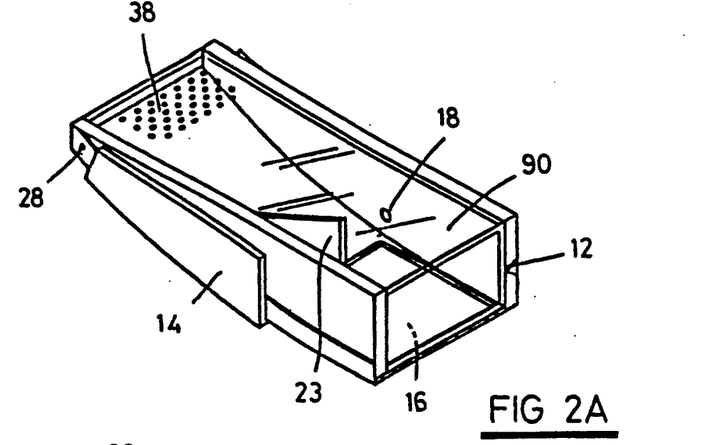
FIGS. 2A, 2B and 2C are views of a queen bee transfer device in three different operative positions.

According to an embodiment of the invention, shown in FIG. 2A, there is provided a fourth position in which the queen exit 22 is blocked by a blocking portion of the device 10, thereby preventing access of bees outside the device to the candy blocking the queen exit. This is useful when unused devices are exposed to bees, such as when a bee keeper or breeder is about to begin to work with the devices, and also when queens are being stored within the devices, the devices being within a queen bank. In the embodiment of FIG. 2A, the queen exit 22 is also blocked by a blocking portion of the device 10 when the device is in its capturing orientation.

Preferably, means are provided to facilitate correct positioning of the device in a desired one of the above orientations, and to reduce the possibility of the device inadvertently slipping from a desired orientation to another orientation. As shown in FIG. 1C, there are preferably provided protrusions 200 and 202, corresponding to the closed, and the worker bee-exit open orientations of the device, and an aperture 204. The protrusions 200 and 202 are provided on the cover of the device and the aperture 204 is, according to the shown embodiment, provided on the housing of the device. The protrusions and apertures are arranged so that protrusion 200 slides into aperture 204 when the device is urged into its closed position and protrusion 202 slides into aperture 204 when the device is urged into its worker bee-exit open position.

In the embodiment of FIGS. 1A–1C, the deposit of bee food and the queen bee exit opening 22 are both located in the cover 14.

Figure 4:
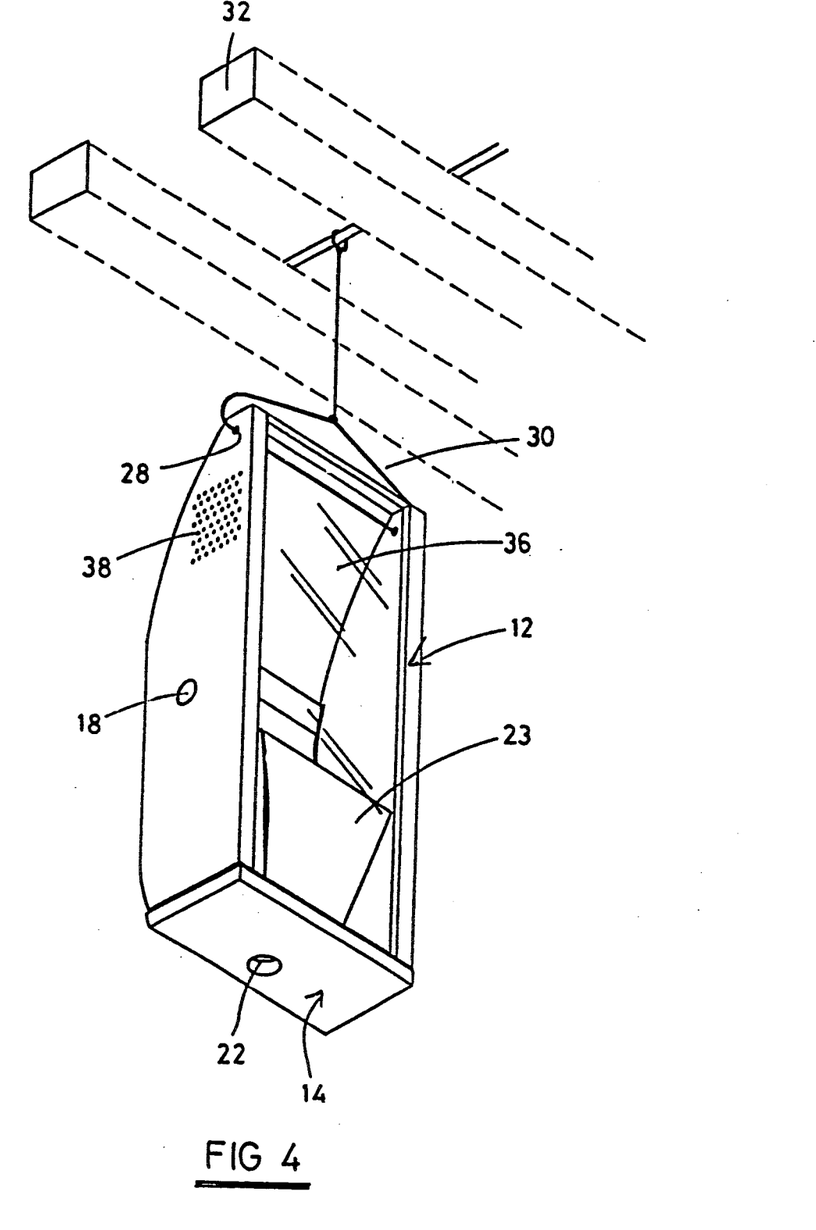
FIG. 4 is an illustration of the queen bee transfer device of FIGS. 2A-2D, in suspended position.

Preferably, there is provided means for suspending the device 10 within a bee hive, which may include one or more suitably positioned apertures 28 through which, as shown in FIG. 4, a rope or wire 20 may be threaded, thereby to allow the device 10 to be suspended from the upper rafters 32 of the hive.

As shown in FIG. 1C, the housing 12 may be formed with a curved bottom surface 16, so as to allow the placing of the entrance opening onto the bees which it is sought to capture so that the remainder of the housing does not touch the honeycomb containing the bees, thereby reducing or substantially eliminating the risk of crushing of bees by the housing during capture of bees. These are preferably provided a plurality of air-holes 38 on at least the curved portion 39 of the bottom surface 36, as shown in FIG. 1C. This allows air to penetrate the device 10 even when a plurality of devices are stacked one next to the other or one on top of the other, thereby facilitating transport of bees in large number of devices.

Figure 2B:
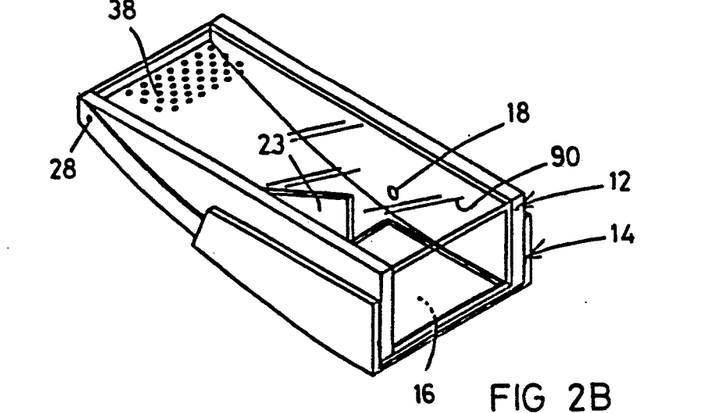
Figure 2C:
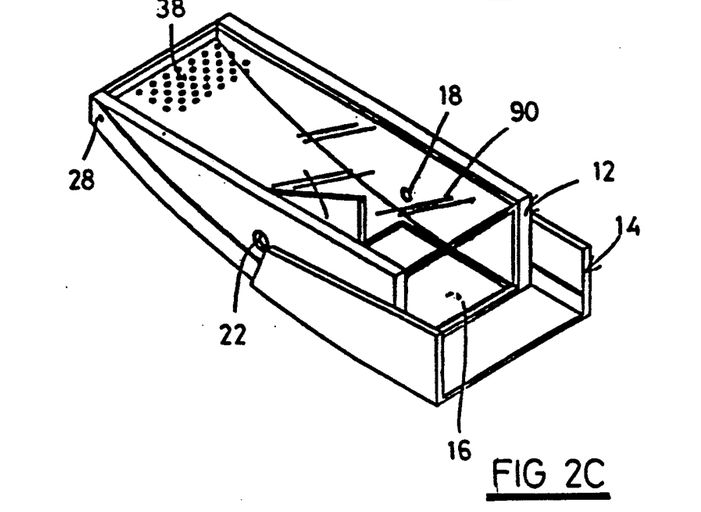

FIGS. 2A–2D illustrate a device having similar structural elements to those in FIGS. 1A–1C which are designated by identical reference numbers. In FIG. 2A, the device 10 is shown in open position with the bee entrance 16 open. In FIG. 2B, the device is shown in a fully closed position, where the bee entrance opening 16 and the queen bee exit are both closed. In FIG. 2C, the device is shown in an intermediate position with the bee entrance opening 16 closed and queen bee exit open, allowing excess of worker bees from the new hive to the candy blocking the queen bee exit.

Figure 2D:
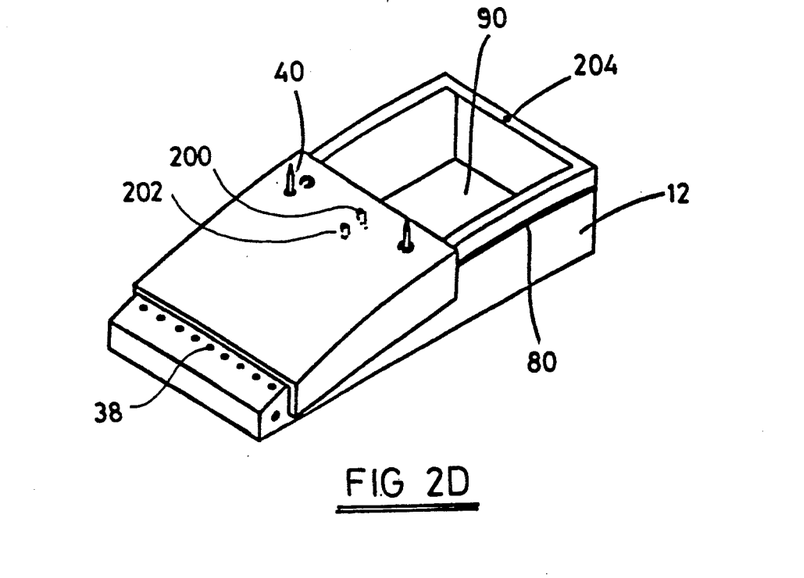
FIG. 2D is a view of the underside of the bee transfer device shown in FIG. 2A.

As shown in FIG. 2D, this embodiment differs from the embodiment shown in FIGS. 1A–1C in that the bottom surface of either the housing or the cover is provided with a plurality of pins or spikes 40 for enhancing engagement of the device with the honeycomb of the hive both during capture of bees and when the device is inserted into the new honeycomb. Two alternative means for securing the device in the new honeycomb are disclosed herein: the pins 40 of the present embodiment and the suspending means shown in FIG. 4. The pins or spikes are useful during capture of bees since they enable a beekeeper to use only one hand to operate the device.

According to a preferred embodiment of the invention, the spikes are removably joined to the housing or cover, so as to allow their removal during transport of the device to increase compactness of storage. According to a second embodiment, the spikes are joined to the housing or cover so as to define a first protruding position and a second retracted position. The first position allows the spikes to be operative as explained above and the second orientation allows the device to assume a relatively compact position so as to facilitate transport of a plurality of stacked devices.

The embodiment of FIGS. 2A–2D also differs from the embodiment of FIGS. 1A–1C in that the cover 14, when open, does not substantially protrude relative to the housing, resulting in compactness of structure of the device even when in its open position. This facilitates easy access to the honeycomb, particularly to the corners thereof. Furthermore, as described in the embodiment of FIGS. 2A-2D, it is possible to selectively prevent access of bees located externally to the device, to the candy blocking queen bee exit 22, when the rest of the openings of the device are closed. Finally, in the embodiment of FIGS. 2A-2D, the queen exit 22 is provided in a side wall of the housing, rather than in an end wall of the cover apparatus, as in FIGS. 1A-1C.

FIGS. 3A to 3H, illustrate eight typical stages in the operation of a bee transfer device 10. The technique for transfer of a queen bee from hive to hive may include the steps of placing the transfer device 10 in an open position over a queen bee and adjacent worker bees in a hive, positioning the cover 14 relative to the housing 12 so as to close the bee entrance opening 16, inserting the device 10 into a new hive, allowing bees from the new hive to enter the device 10 via the queen bee exit opening 22 and allowing the queen bee to exit the device into the new hive via the queen bee exit opening 22.

If a worker bee exit is provided, the technique may include the step of positioning the cover 14 relative to the housing 12 to permit worker bee egress through the worker bee exit opening 18, preferably prior to enabling the egress of the queen bee.

Figure 3A:
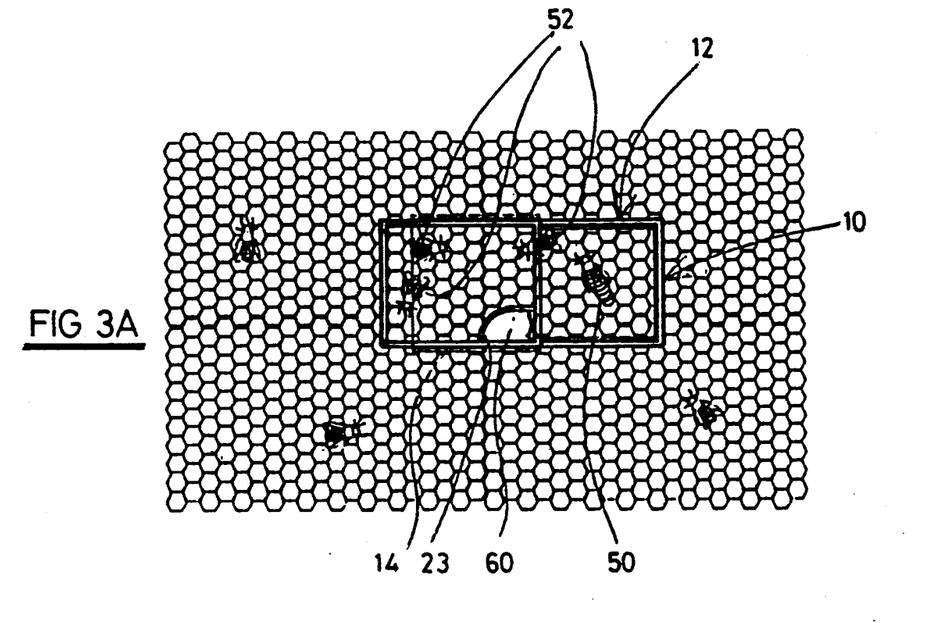
FIGS. 3A, 3B, 3C, 3D, 3E, 3F, 3G and 3H illustrate eight stages in the operation of a device according to a preferred embodiment of the invention.
Figure 3B:
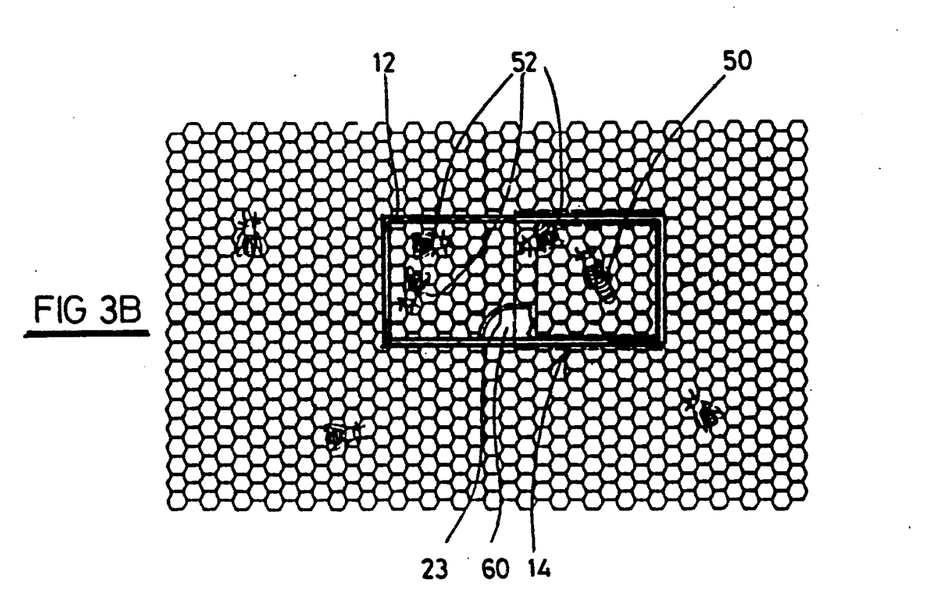

In FIG. 3A, there are shown a queen bee 50 from a first hive and a plurality of worker bees 52 from the first hive with a device 10, in an open position (having an already filled candy receptacle 23) placed over them. The number of worker bees (three) shown captured by the device is merely illustrative. In FIG. 3B, the bee entrance opening 16 has been closed and the bees are trapped within the device 10.

Figure 3C:
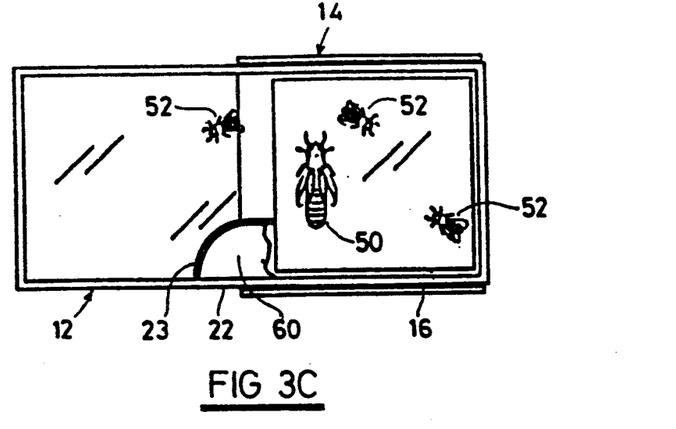

In FIG. 3C, the device has been removed form the honeycomb.

Figure 3D:
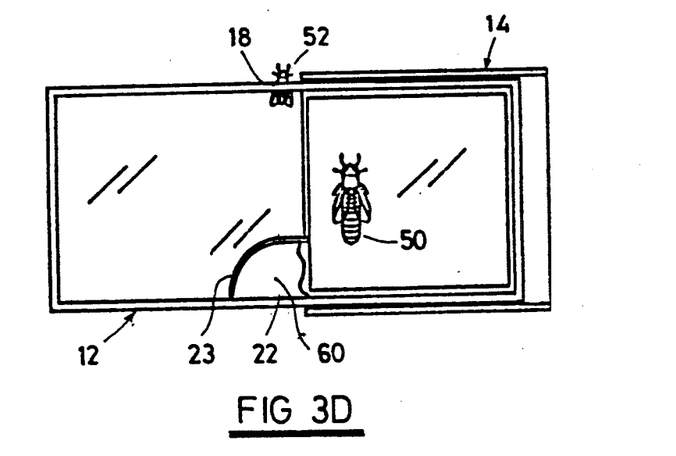

In FIG. 3D, the device has been urged into the worker bee exit-open position and the last of the worker bees 52 is shown exiting worker bee exit 18.

Figure 3E:
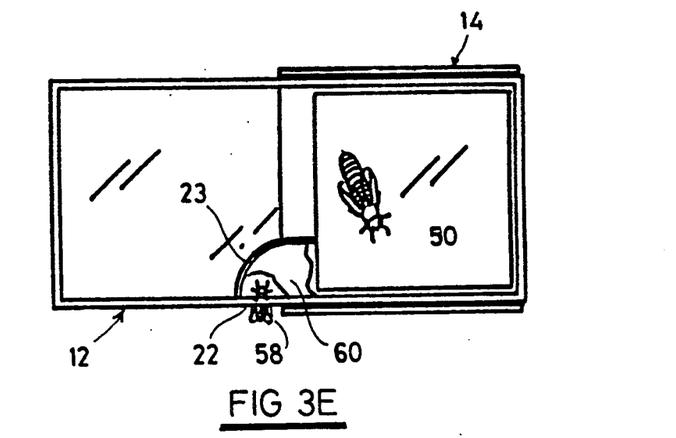

In FIG. 3E, the device 10 has been returned to its closed position and placed in the new hive and the worker bees 58 from the new hive have begun to consume the candy 60 in candy enclosure 23.

Figure 3F:
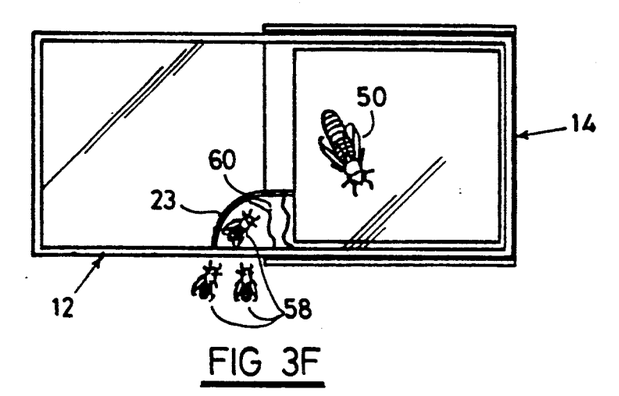
Figure 3G:
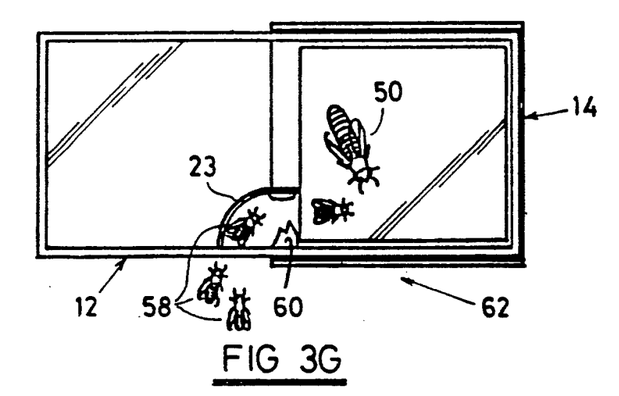
Figure 3H:
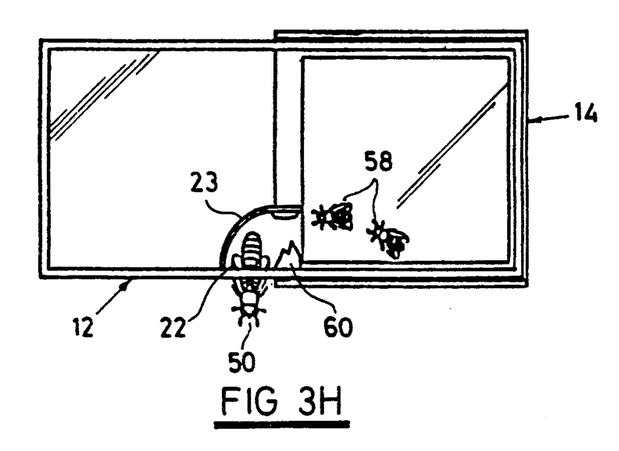

In FIG. 3F, it is shown that worker bees 58 gradually consume more of the candy 60 until, as shown in FIG. 3G they create a passageway from the interior of the new hive 62 to the interior of the device 10 via opening 22. As shown in FIG. 3H, this passageway allows access of the worker bees 58 to the queen bee and also allows the queen bee to exit the device 10.

Figure 5A:
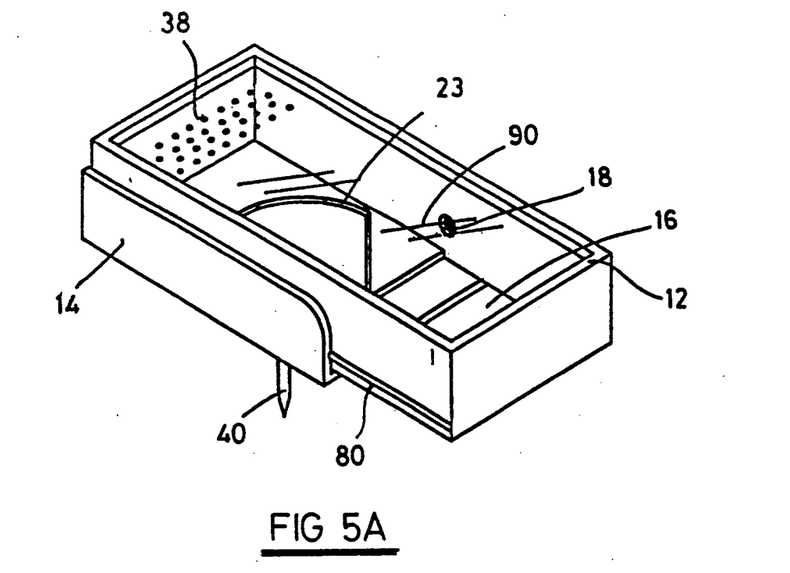
FIGS. 5A and 5B are views of a device in respective bee entrance open (capturing) and queen exit open (queen exiting) positions.
Figure 5B:
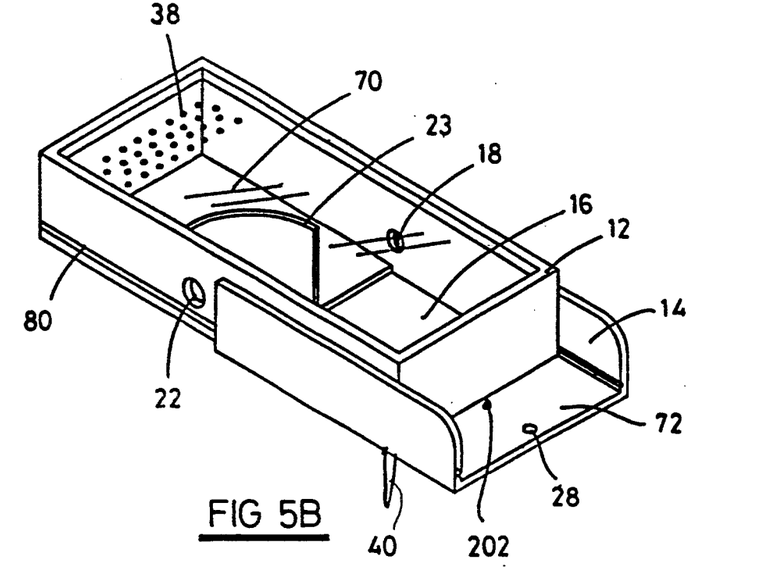

FIGS. 5A and 5B, illustrate a preferred embodiment of the invention. This is similar to that of FIGS. 2A-2D. However, the bottom surfaces 70 and 72 of the housing and of the cover are substantially planar. This results in a more compact structure than that of FIGS. 2A-2D. The structure of FIGS. 5A-5B, is sometimes easier to handle, particularly when wearing gloves than that of FIGS. 2A-2D. In FIG. 5A, the worker bee exit is in an open position. FIG. 5B shows the device in its open position.

Figure 6A:
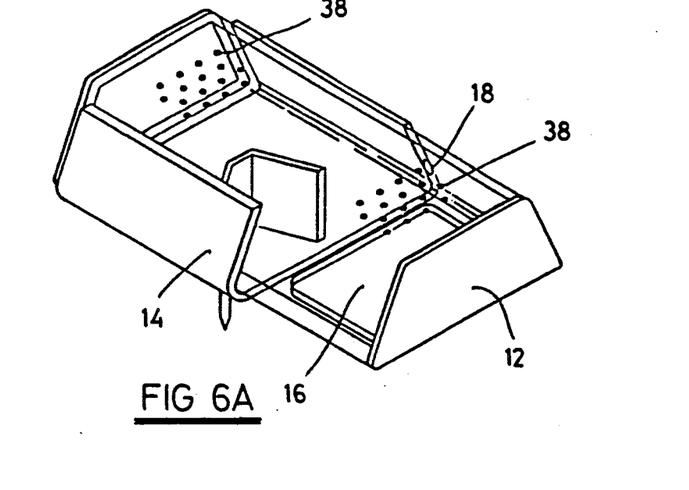
FIGS. 6A and 6B are views of a device in accordance with another embodiment of the invention in respective open (capturing) and queen bee egress positions.
Figure 6B:
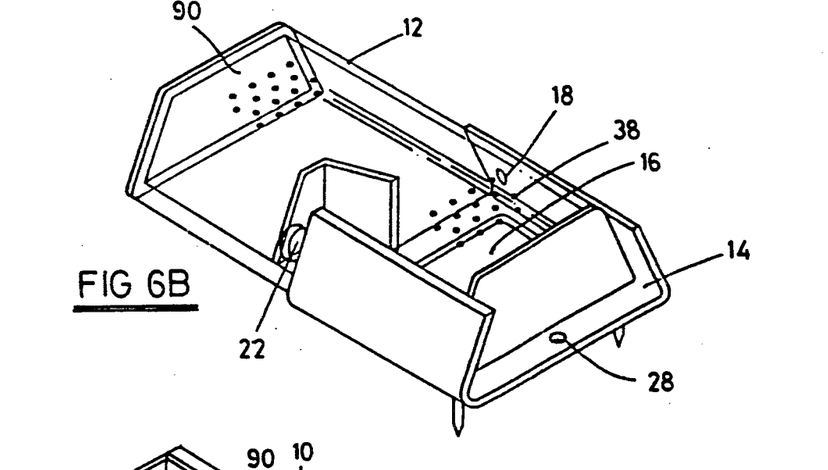

FIGS. 6A and 6B, illustrate a device wherein the tracks provided in previous embodiments may be eliminated due to the non-perpendicular orientation of the walls of the housing 12 and of the cover 14 relative to the floors of the housing and of the cover. The structure of the device of FIGS. 5A and 5B is also particularly convenient for handling.

Figure 7:
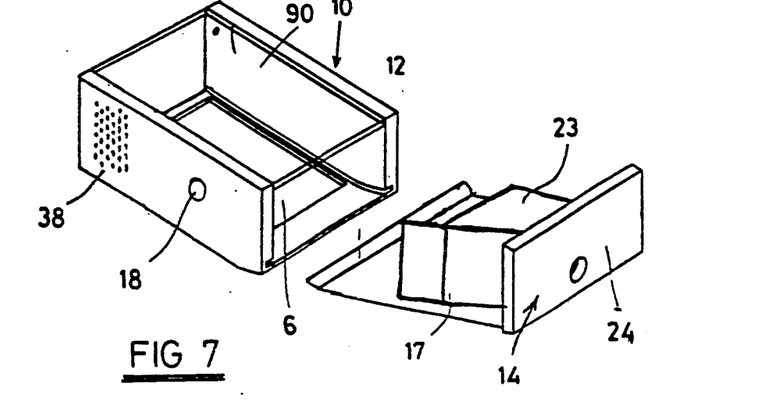
FIG. 7 is a view of a device in a queen bee capturing orientation.

FIG. 7, is an illustration of a device in a queen bee capturing position. This is similar to that of FIG. 1; however, no curved bottom surface is provided and the dimensions of the bee entrance 16 are almost as great as the dimensions of the entire bottom surface.

The devices shown and described herein may be made from any suitable material such as plastic, as casting. Preferably, the ceiling of the device is made of a transparent material such as Perspex or any other durable transparent plastic, to allow monitoring of the bees. Preferably, airholes are provided which are integrally formed in the device itself.

The device shown is suitable for both capture and transport of a queen bee since sustenance (air though the airholes and food from the trapped worker bees who are in turn nourished by the provided candy), is provided for the queen.

Figure 8:
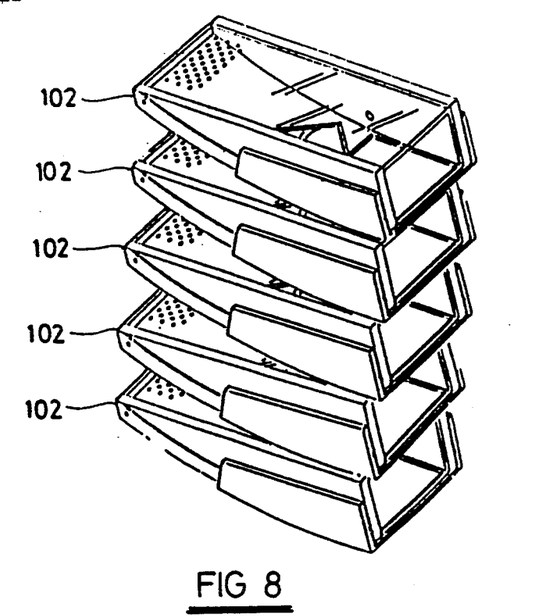
FIG. 8 is a view of a stacked plurality of queen bee capture and transport devices.

FIG. 8 is a view of a stacked plurality 100 of queen bee capture and transport devices 102, which have various applications;

1. For conveying a large number of queens by air, land or sea;
2. For use as a queen bank, where each of the devices 102 typically include any of the devices of FIGS. 1A-2D and 5A-7;
3. For use as a hatching device for a plurality of queen grubs; each of the devices 102 includes any of the devices of FIGS. 1A-2D and 5A-7, and also includes means for engaging a queen cell. Three methods of mounting a queen cell in a queen capture and transport device are illustrated by FIGS. 9A-9C.

Figures 9A, 9B, 9C:
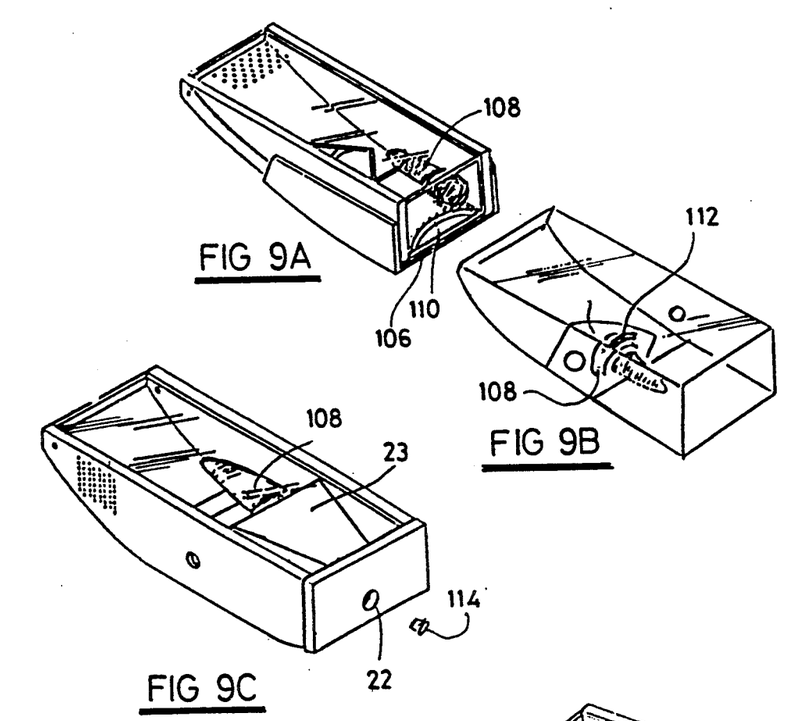
FIGS. 9A-9C are views of hatching enclosures according to three preferred embodiments of the invention.

In FIG. 9A, a generally arc-shaped element 106 is attached at both ends thereof to the bottom surface of the queen bee capture and transport device. The queen cell 108 is tucked between the arc-shaped element and the top surface of the capture and transport device. The arc-shaped element 106 may be formed of a flexible and preferably transparent material such as PVC or polyethylene, of a thickness of approximately 0.5-3 mm. The arc-shape of the element 106 allows queen cells of a variety of sizes to be secured. Larger queen cells are secured adjacent one of the two edges of the arc, where the distance between the arc element and the to surface 90 is relatively large, and smaller queen cells are secured at the middle of the arc, where the distance between the arc element and the top surface 90 is relatively small. Preferably, protrusions 110 are formed along the top surface of the arc element to enhance engagement of the queen cell therewith.

In FIG. 9B, the queen cell 108 is shown attached to a wall of the candy box 23, as by a clip 112. Preferably, the clip 112 is formed of flexible and preferably transparent material such as PVC or polyethylene, of a thickness of approximately 0.5-3 mm. The flexibility of the element 112 allows queen cells of a variety of sizes to be secured thereby.

In FIG. 9C, the queen cell is shown wedged into the candy box 23. Since the cross-section of the candy box is nonuniform, queen cells of a variety of sizes may be wedged thereinto.

The queen bee exit 22 is plugged by a plug 114 to prevent escape of the queen, once hatched.

According to a further embodiment, the cage-type device of invention is provided with means for moving the queen bee to a desired position in the device. This is of importance for tagging and also, if desired, for clipping of one of the wings. It is of course important that such means enable such movement in a delicate manner, so as to prevent any possible injury to the queen bee.

Accordingly, the device of the invention may be provided in any of its side-walls, cover or in the floor member, with a T-shaped slot which extends up to a small distance from the front end of the device. There is further provided a rectangular member, made from a resilient material, having a width somewhat smaller than the upper bar of the "T" and a length somewhat smaller than the width of the device. This rectangle extends via a narrow bar to a small handle, said narrow bar being somewhat smaller than the other member of the "T". In order to move the queen bee, it is first ascertained that the queen is in the part of the device which can be "swept" by the rectangular member; the rectangular member is inserted so as to constitute an inner partition occupying the cross-section of the device, and is moved towards the forward end of the device, thus moving the queen to the desired location. After the desired tagging and/or clipping, the rectangular member is moved again to its initial position and withdrawn through the slot.

A device of this type is illustrated with reference to FIGS. 10, 11, 12 and 14, where 100 is the cage type device, provided at its lateral wall 101 with a T-shaped slot 102. There is provided a movable member 103, comprising the rectangle 104, the connecting bar and the handle 105.

When the queen-bee 106 is in the front part of the cage, movement of the movable member 103 along the slot 102 towards the forward end, inclining it as required, moves the queen to said forward part.

Figures 10, 11, 12:
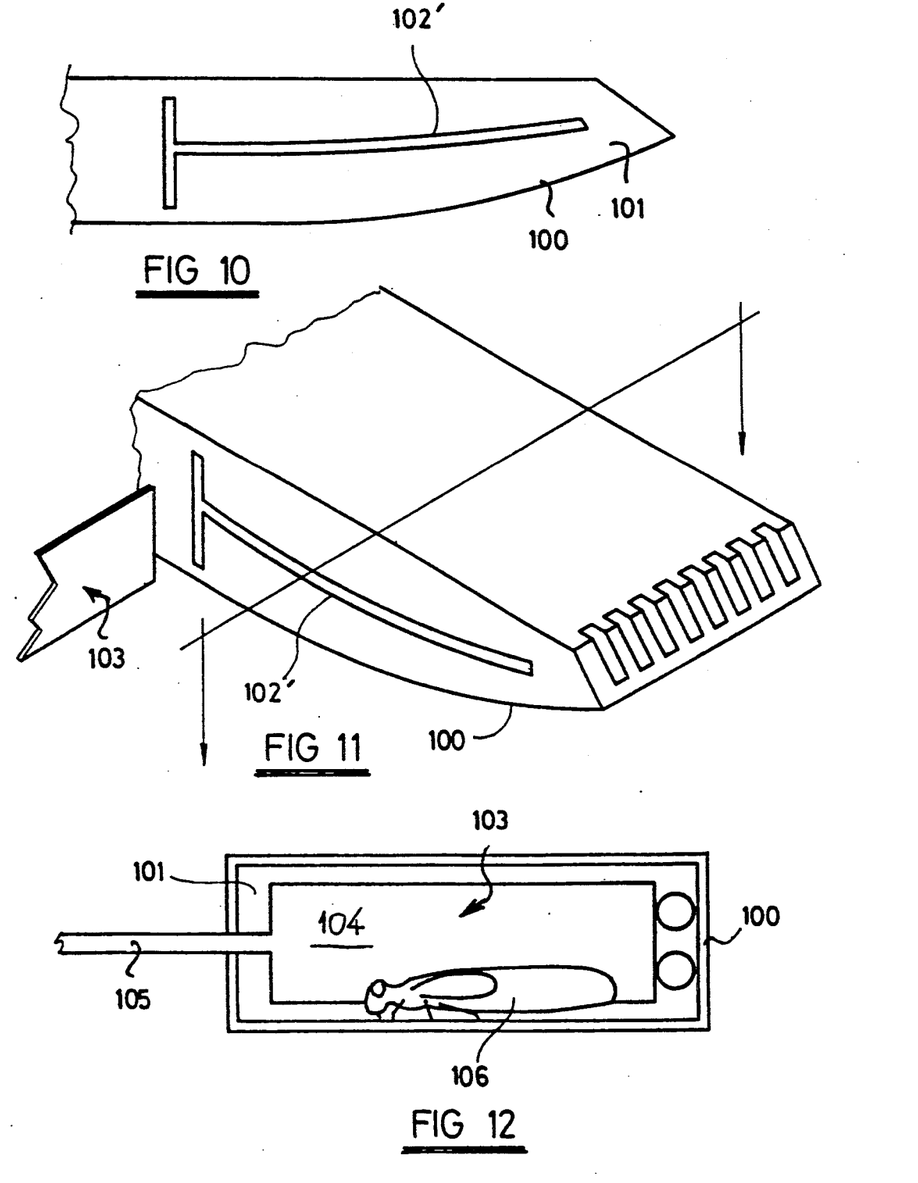
FIG. 10 is a side-view of part of a cage according to the invention.
FIG. 11 is a perspective view of part of the same cage.
FIG. 12 is a sectional front view of a device of FIG. 10, with inserted sweeping member.
Figure 14:
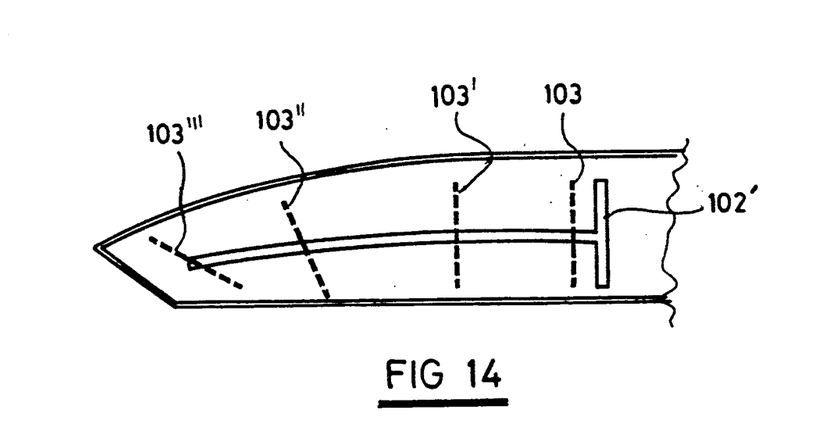
FIG. 14 is a side view of the part of a cage of the type shown in FIG. 10, illustrating various positions of the sweeping member.

FIG. 14 illustrates a slightly modified version of the cage of FIG. 10, and here the positions 103, 103', 103" and 103"' illustrate the position of the movable member as it is moved towards the frontal end.

Figure 13:
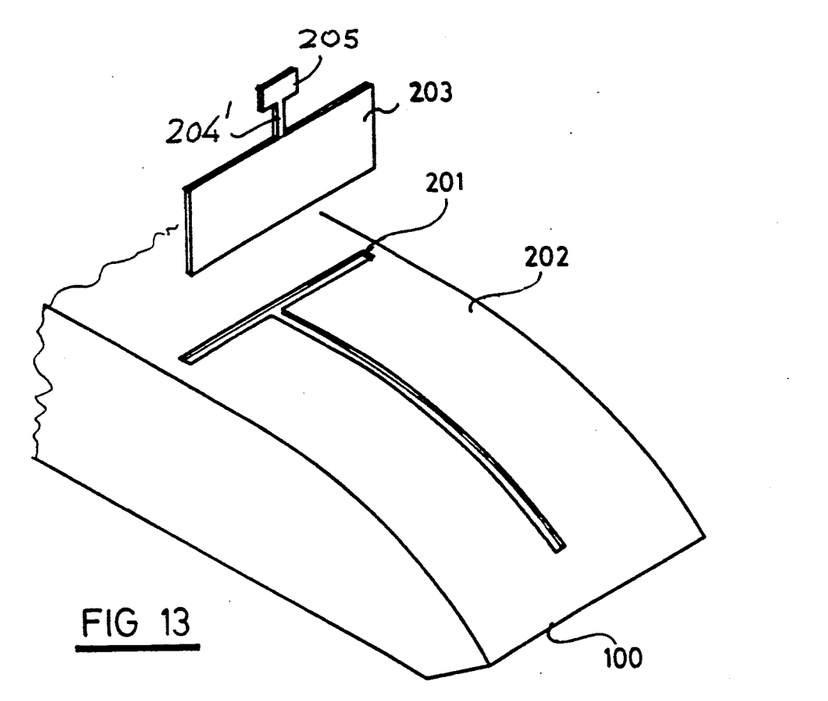
FIG. 13 is a perspective view of a cage with T-shaped slot in the roof member.

As illustrated in FIG. 13, the cage 100 is provided with a T-shaped slot 201 in its roof member 202, and there is provided a rectangular member 203, provided with connecting section 204 and handle 205, so that the rectangle 203 can be inserted via slot 201, and moved to the forward part of cage 100, thus moving the queen bee to this forward section.

Figure 15:
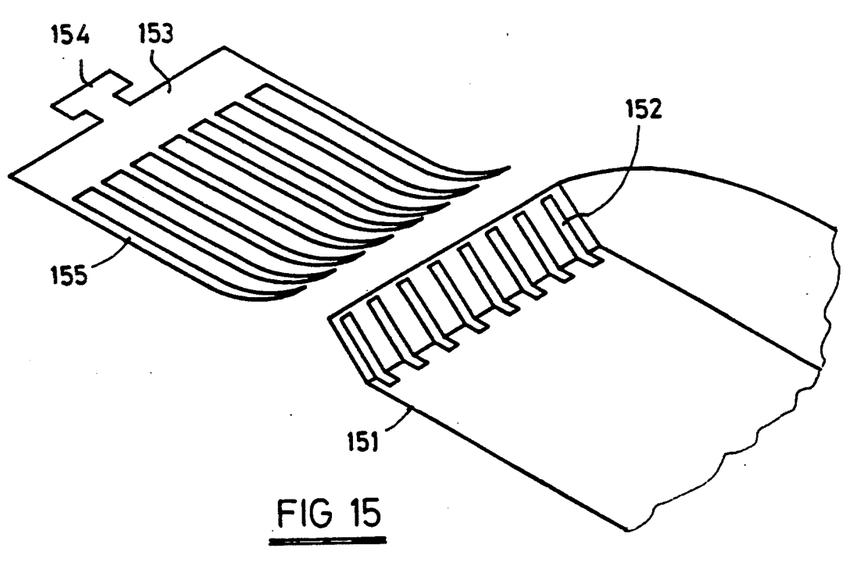
FIGS. 15, 16 illustrate a cage with a plurality of parallel slots in the frontal part, and a comb-like sweeping member adapted to be inserted through the slots, to move the queen bee as illustrated in FIG. 16, making possible paint-marking of the queen-bee and wing clipping.
Figure 16:
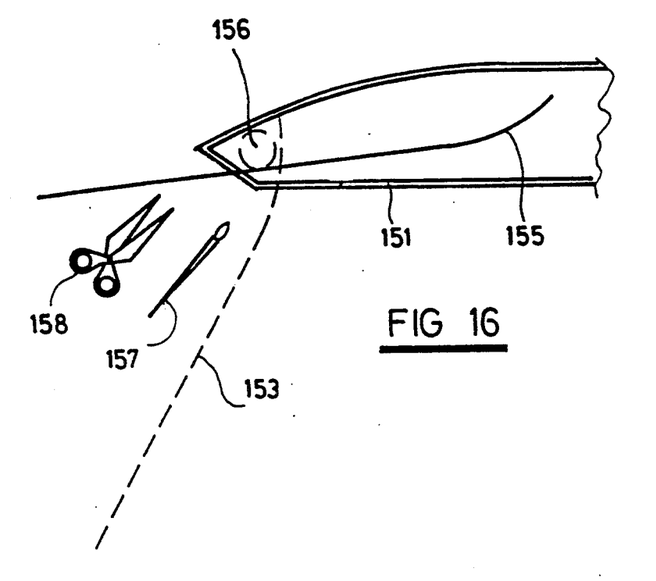

As shown in FIG. 15, member 151 is part of the floor of a cage of the invention, provided near its front with a plurality of parallel slots 152. There is provided a comb-shaped movable member 153, provided with handle 154, the teeth 155 of which can be inserted via the slots 152, to assume a position as indicated in FIG. 16, where 156 indicates a queen bee moved by means of said member 153 to the frontal section of the cage, where a brush 157 can be used to mark the queen with a certain dye, or where scissors 158 can be used to clip one of its wings.

We claim:

1. A cage-like device for the capture, transport and release of a queen-bee, together with worker bees, comprising two slidingly connectable units which together constitute outer walls of the cage, comprising an entry port for the queen bee and worker bees; an exit-port for the worker bees, an integral storage compartment for the bee-food which compartment is provided with an exit port for the queen bee, and air-holes in at least one wall, said two units being of such construction that the sliding movement of the one with respect to the other permits opening of the entry port for scooping up the queen and worker bees while the other openings are closed; a second position where the entry port and all the other openings except for airholes are closed; a third position where said exit-port for the worker-bees only is open, and a fourth position where access to the exit-port of the queen, located in a wall of the storage compartment, is free.

2. A device according to claim 1, wherein one of the units comprises a floor section and three wall sections and where the second unit comprises a cover and front section.

3. A device according to claim 2, provided with spikes attached to the floor section, facilitating engagement of a support substrate.

4. A device according to claim 1, wherein one unit comprises a floor section and two side panels, and where the second unit comprises a cover connected to a front panel, both units defining an enclosure, at least one of the floor and cover elements being curved and meeting the other at the rear end of the device.

5. A device according to claim 1, where the cage further comprises a floor panel and the entry port is provided in the floor panel for scooping up the queen and optionally also worker-bees.

6. A device according to claim 1, where the storage compartment is provided with at least one inner wall defining a meandering path from the interior to the queen exit-port.

7. A device according to claim 1, comprising means for moving the queen to a predetermined position for tagging and/or wing clipping.

8. A device according to claim 7, where such means comprises at least one slot perpendicular to the cross-section of the device, in any of the side-walls or in the cover member, in combination with a member, part of which is insertable through such slot and which can be moved inside the cage towards the front part of the device, so as to move the queen to such front part.

9. A device according to claim 7, where the movable part has a rectangular cross-section, provided with a handle, and which can be inserted through the slot and moved at varying inclinations towards the front part of the cage.

10. A device according to claim 8 comprising a plurality of slots and where the member adapted to move the queen bee is in comb-form.

11. A device according to claim 1, further comprising a transparent cover.

12. A device according to claim 1, provided with means for suspension from a support.

13. A device according to claim 1, where a floor section curved for facilitating the scooping-up of the queen bee and possibly worker bees is provided.

14. A device according to claim 1, of readily stackable configuration, providing air access.

15. A method of capturing, transporting and releasing a queen bee, which comprises scooping up the queen bee by means of a cage-like device comprising two slidingly connectable units which together constitute outer walls of the cage, said cage further comprising an entry port in a floor panel thereof for scooping-up the queen bee and optionally the worker bees; an exit-port for the worker bees, an internal storage compartment for the bee-food which compartment is provided with an exit port for the queen bee, and air-holes in at least one wall, said two units being of such construction that the sliding movement of the one with respect to the other permits opening of the entry port for scooping up the queen and worker bees while the other openings are closed; a second position where the entry port and all other openings, except for air-holes, are closed; a third position where said exit-port for the worker-bees only, is open, and a fourth position where access to the exit-port of the queen located in a wall of the storage compartment is free, via the bee entry port; closing this and all other openings for transport and storage; opening the exit port for the worker-bees, if such are present; providing free access from both inside the device and its outside to the opening in the panel of the food-storage compartment, and permitting exit of the queen bee through this opening after bees have eaten through the stored bee-food, opening a path for said queen bee through said exit.

* * * * *